United States Patent
Shen et al.

(10) Patent No.: US 12,184,572 B2
(45) Date of Patent: Dec. 31, 2024

(54) INFORMATION TRANSMISSION METHOD, NETWORK DEVICE, AND TERMINAL

(71) Applicant: VIVO MOBILE COMMUNICATION CO., LTD., Guangdong (CN)

(72) Inventors: Xiaodong Shen, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 386 days.

(21) Appl. No.: 17/581,725

(22) Filed: Jan. 21, 2022

(65) Prior Publication Data

US 2022/0150016 A1    May 12, 2022

Related U.S. Application Data

(63) Continuation of application No. PCT/CN2020/102093, filed on Jul. 15, 2020.

(30) Foreign Application Priority Data

Jul. 24, 2019    (CN) .......................... 201910673800.2

(51) Int. Cl.
*H04L 5/00* (2006.01)
*H04L 27/26* (2006.01)

(52) U.S. Cl.
CPC ........ *H04L 5/0048* (2013.01); *H04L 27/2602* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 2006/0115010 A1 | 6/2006 | Rog et al. | |
| 2017/0374664 A1 | 12/2017 | Kimura et al. | |
| 2018/0097671 A1* | 4/2018 | Huang | H04L 27/261 |
| 2018/0176058 A1* | 6/2018 | Kim | H04L 27/2675 |
| 2019/0386862 A1 | 12/2019 | Islam et al. | |
| 2020/0014515 A1* | 1/2020 | Qin | H04L 5/0051 |
| 2021/0195614 A1* | 6/2021 | Lin | H04L 5/0078 |
| 2021/0392625 A1* | 12/2021 | Lin | H04W 72/23 |

FOREIGN PATENT DOCUMENTS

| | | | |
|---|---|---|---|
| CN | 101076019 A | * | 11/2007 |
| CN | 107005333 A | | 8/2017 |
| CN | 107294671 A | | 10/2017 |
| CN | 109565489 A | | 4/2019 |
| EP | 3445011 A1 | | 2/2019 |
| WO | 2014/191273 A2 | | 12/2014 |

OTHER PUBLICATIONS

International Search Report and Written Opinion of International Application No. PCT/CN2020/102093 issued by the Chinese Patent Office on Oct. 19, 2020.
Chong Zhang et al., A Doppler Shift Estimator for Millimeter-Wave Communication Systems on High-Speed Railways, 2018 IEEE/CIC International Conference On Communications in China (ICCC), XP033517322, p. 1-5, IEEE.
Extended European Search Report for the European Patent Application No. 20843423.3 issued by the European Patent Office on Jul. 19, 2022.

* cited by examiner

*Primary Examiner* — Lance Leonard Barry
(74) *Attorney, Agent, or Firm* — IP & T GROUP LLP (57) ABSTRACT

An information transmission method includes: sending target information on at least one sub symbol of a first OFDM symbol. The first OFDM symbol includes at least two sub symbols.

20 Claims, 6 Drawing Sheets

INFORMATION TRANSMISSION METHOD, NETWORK DEVICE, AND TERMINAL

CROSS-REFERENCE TO RELATED APPLICATIONS

This application is a Bypass Continuation Application of PCT/CN2020/102093 filed on Jul. 15, 2020, which claims priority to Chinese Patent Application No. 201910673800.2, filed on Jul. 24, 2019, which are incorporated herein by reference in their entirety.

TECHNICAL FIELD

Embodiments of the present disclosure relate to the field of communications application technologies, and in particular, to an information transmission method, a network device, and a terminal.

BACKGROUND

For a high frequency millimeter-wave (>52.6 GHz) system, as a frequency increases, an available frequency bandwidth increases. For example, an approximate 7 GHz frequency is available on a 60 GHz frequency band. Therefore, to support a higher peak rate, the high frequency millimeter-wave system generally needs to support a high bandwidth, for example, 2 GHz. In this case, for a frequency range (FR) 1 (<7 GHz) frequency band and an FR2 (>7 GHz and <52.6 GHz) frequency band, a larger sub-carrier space (SCS), for example, 0.96 GHz, 1.92 GHz, or 3.84 GHz, needs to be used, to reduce a value of fast fourier transformation (FFT).

SUMMARY

Embodiments of the present disclosure provide an information transmission method, a network device and a terminal.

According to a first aspect, some embodiments of the present disclosure provide an information transmission method, applied to a network device, and including:
  sending target information on at least one sub symbol of a first orthogonal frequency division multiplexing (OFDM) symbol, where
  the first OFDM symbol includes at least two sub symbols.

According to a second aspect, some embodiments of the present disclosure further provide an information transmission method, applied to a terminal, and including:
  receiving target information sent by a network device on at least one sub symbol of a first OFDM symbol, where
  the first OFDM symbol includes at least two sub symbols.

According to a third aspect, some embodiments of the present disclosure further provide a network device, including:
  a first sending module, configured to send information on at least one sub symbol of a first OFDM symbol, where
  the first OFDM symbol includes at least two sub symbols.

According to a fourth aspect, some embodiments of the present disclosure further provide a network device, including: a memory, a processor, and a computer program that is stored in the memory and executable on the processor, where when the computer program is executed by the processor, the steps of the foregoing information transmission method are implemented.

According to a fifth aspect, some embodiments of the present disclosure further provide a non-transitory computer readable storage medium. The non-transitory computer readable storage medium stores a computer program. When the computer program is executed by a processor, the steps of the foregoing information transmission method are implemented.

According to a sixth aspect, some embodiments of the present disclosure further provide a terminal, including:
  a receiving module, configured to receive target information that is sent by a network device on at least one sub symbol of a first OFDM symbol, where
  the first OFDM symbol includes at least two sub symbols.

According to a seventh aspect, some embodiments of the present disclosure further provide a terminal, including: a memory, a processor, and a computer program that is stored in the memory and executable on the processor. When the computer program is executed by the processor, the steps of the foregoing information transmission method are implemented.

According to an eighth aspect, some embodiments of the present disclosure further provide a non-transitory computer readable storage medium. The non-transitory computer readable storage medium stores a computer program. When the computer program is executed by a processor, the steps of the foregoing channel transmission method are implemented.

BRIEF DESCRIPTION OF DRAWINGS

To describe the technical solutions of the embodiments of the present disclosure more clearly, the following briefly describes the accompanying drawings required for describing some embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, the embodiments are provided to enable more thorough understanding of the present disclosure and convey the scope of the present disclosure to a person skilled in the art.

Terms "first", "second", and the like in the specification and claims of this application are used to distinguish between similar objects, instead of describing a specific sequence or order. It should be understood that the term termed in such a way is interchangeable in proper circumstances so that the embodiments of this application described herein can be implemented in an order other than the order illustrated or described herein. In addition, terms "include", "have", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. "And/or" used in the specification and claims means at least one of the connected objects.

The following description provides examples and does not limit the scope, applicability, or configuration set forth in the claims. Changes may be made to the function and arrangement of discussed elements without deviating from the spirit and scope of this present disclosure. In various examples, various procedures or components may be omitted, replaced, or added appropriately. For example, the described method may be executed based on a sequence different from the description, and various steps may be added, omitted, or combined. In addition, features described with reference to some examples may be combined in other examples.

Figure 1:
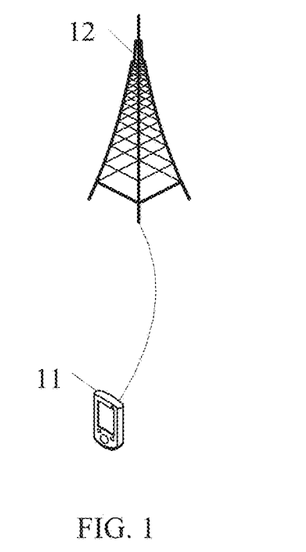
FIG. 1 is a structural diagram of a network system to which some embodiments of the present disclosure are applicable.
Figure 2:
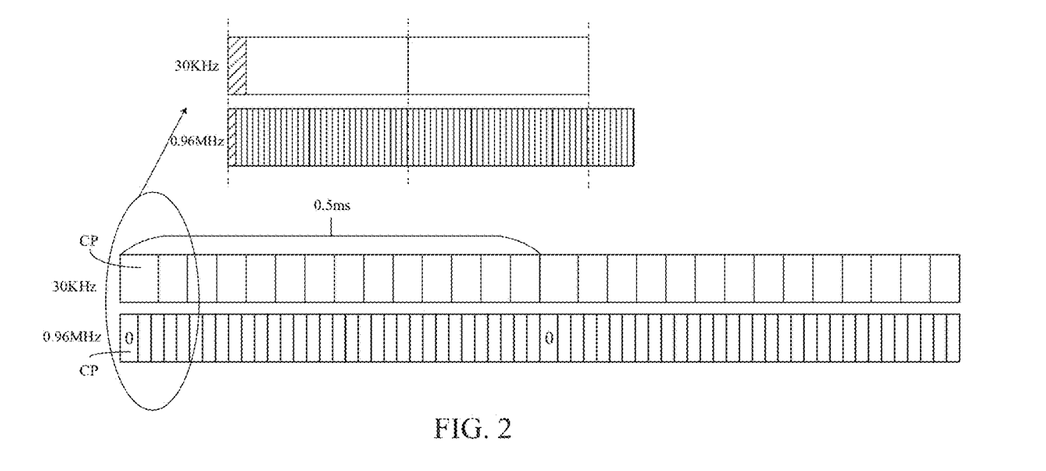
FIG. 2 is a diagram of comparison between a frame structure of 0.96 MHz SCS used in a related high frequency millimeter-wave system and a frame structure of 30 KHz SCS used in an NR system.

Referring to FIG. 1, FIG. 1 is a block diagram of a wireless communications system to which some embodiments of the present disclosure are applicable. The wireless communications system includes a terminal 11 and a network device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 11 is not limited in some embodiments of the present disclosure. The network device 12 may be a base station or a core network. The base station may be a base station of 5G and later releases (for example, a gNB and a 5G NR NB), or a base station in another communications system (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in some embodiments of the present disclosure, the base station in the NR system is merely used as an example, but does not limit a specific type of the base station.

In new radio (New Radio, NR) Rel 15 FR 1 & FR2, a length of a symbol $l$ ($l \in \{0, 1, \ldots, N_{slot}^{subframe,\mu} N_{symbol}^{slot} - 1\}$) in one subframe is $(N_u^\mu + N_{CP,l}^\mu)*Tc$, where $N_u^\mu = 2048k \cdot 2^{-\mu}$;

$$N_{CP,l}^\mu = \begin{cases} 512k \cdot 2^{-\mu} & \text{extended cyclic prefix} \\ 144k \cdot 2^{-\mu} + 16\,k & \text{normal cyclic prefix}, l = 0 \text{ or } l = 7 \cdot 2^\mu \\ 144k \cdot 2^{-\mu} & \text{normal cyclic prefix}, l \neq 0 \text{ or } l \neq 7 \cdot 2^\mu \end{cases}$$

Tc is a sampling time, and µ is configured SCS.

For the high frequency millimeter-wave (>52.6 GHz) system, if 0.96 MHz SCS is used, a diagram of frame structure comparison between the 0.96 MHz SCS and 30 KHz SCS is shown in FIG. 1. It can be learned from FIG. 1 that every 0.5 ms, there is a long-cyclic-prefix (CP) symbol different from the other symbol. In addition, considering configuration of the 0.96 MHz SCS, 1.92 MHz SCS, and 3.84 MHz SCS, a length of the long-CP symbol different from the other symbol can be calculated according to the foregoing formula. When high order SCS is used in the high frequency millimeter-wave system, the CP that appears periodically (every 0.5 ms) is much longer than a CP of the other symbol. If the resource is still used for CP transmission as in the prior art, an unnecessary waste of a long-CP resource in time domain may be caused, leading to low spectrum utilization.

Figure 3:
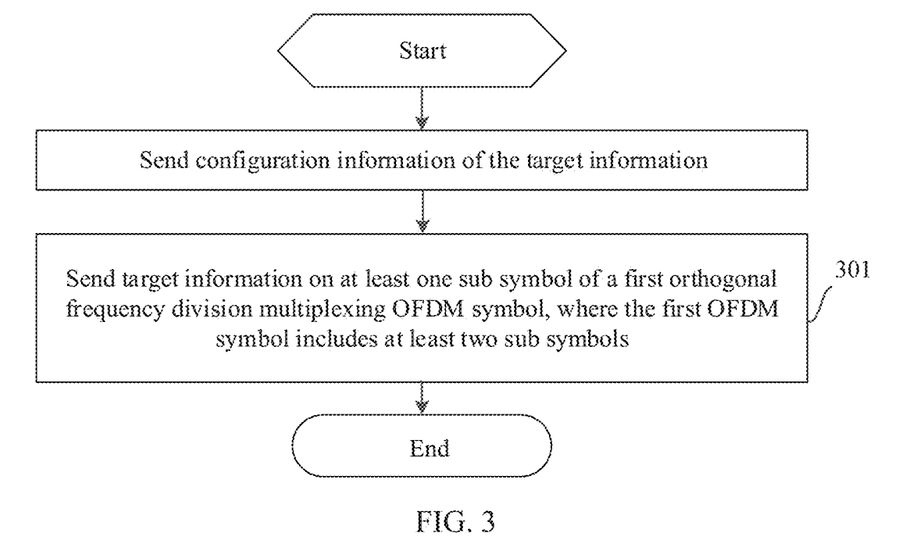
FIG. 3 is a first schematic flowchart of an information transmission method according to some embodiments of the present disclosure.

As shown in FIG. 3, some embodiments of the present disclosure provide an information transmission method, applied to a network device, and including:

step 301. Send target information on at least one sub symbol of a first OFDM symbol, where the first OFDM symbol includes at least two sub symbols.

Figure 4:
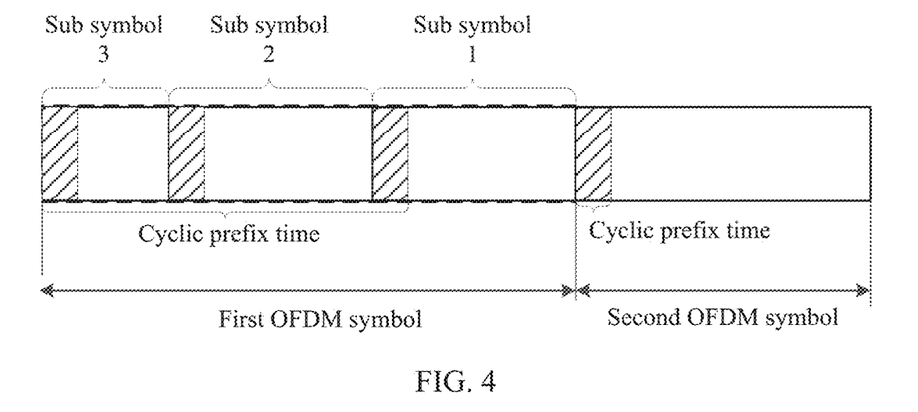
FIG. 4 is a schematic structural diagram of a first OFDM symbol according to some embodiments of the present disclosure.

In this step, the first OFDM symbol is divided into the at least two sub symbols. Referring to FIG. 4, the first OFDM symbol is divided into three symbols, namely, a sub symbol 1, a sub symbol 2, and a sub symbol 3.

Optionally, the first OFDM symbol is a longest OFDM symbol in a same frame structure. In other words, a cyclic prefix time of the first OFDM symbol is greater than a cyclic prefix time of the other OFDM symbol in the same frame structure.

Referring to FIG. 4, the cyclic prefix time of the first OFDM symbol before division is greater than a cyclic prefix time of a second OFDM symbol.

Herein, the first OFDM symbol is divided into several sub symbols. For some sub symbols, for example, the sub symbol 2 and the sub symbol 3 in FIG. 4, a time-domain resource that is used to transmit a CP before the first OFDM symbol is divided may be occupied to transmit information. In this way, when high order SCS is used to transmit information in a high frequency millimeter-wave system, an unnecessary waste of a periodic long CP resource in time domain can be effectively improved, and spectrum utilization can be effectively improved.

In addition, in a first optional implementation, this step may include:
sending the target information on the at least one sub symbol of the first OFDM symbol according to a protocol.

For example, it is specified by the protocol that a time tracking signal (for example, a tracking reference signal (TRS)) or periodic broadcast information is sent in a cyclic prefix time before the first OFDM symbol is divided.

Figure 5:
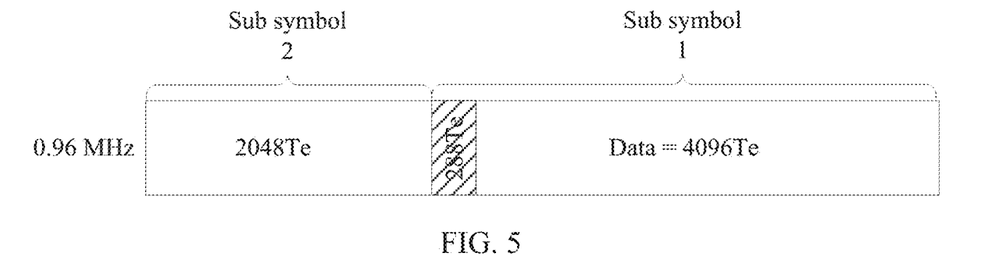
FIG. 5 is a schematic structural diagram of a first OFDM symbol using 0.96 MHz sub-carrier space according to some embodiments of the present disclosure.
Figure 6:
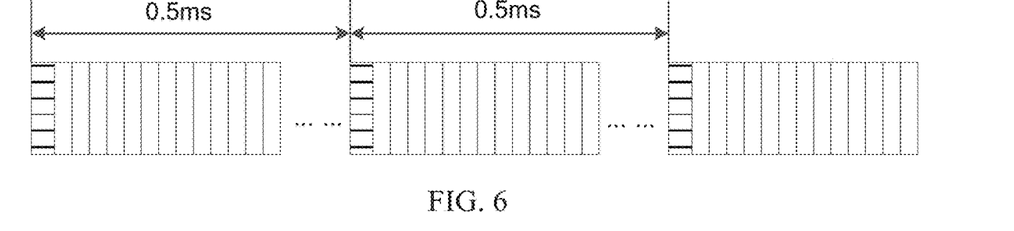
FIG. 6 is a schematic diagram of a sending status of sending information on a sub symbol 2 in FIG. 5 according to a protocol.

In an example, as shown in FIG. 5, it is assumed that 0.96 MHz sub-carrier space is used, and information is sent on the first OFDM symbol that appears every 0.5 ms in an NR system. Herein, the first OFDM symbol includes the sub symbol 1 and the sub symbol 2. In other words, the first OFDM symbol is divided into the two sub symbols. It is specified by the protocol that a TRS mapped to an even-numbered sub-carrier is sent on the periodic sub symbol 2. A user may perform time-frequency tracking by using the TRS. A sending status is shown in FIG. 6. In FIG. 6, a part filled with squares is used to represent the sub symbol 2.

It should be noted that optionally, a time-domain length of each sub symbol is specified by a protocol or configured by a network.

In the information transmission method according to some embodiments of the present disclosure, the target information is sent on the at least one sub symbol of the first OFDM symbol, where the first OFDM symbol includes the at least two sub symbols. In this way, the information is sent on the at least one sub symbol in the at least two sub symbols obtained by dividing the first OFDM symbol, to effectively improve an unnecessary waste of a periodic long-CP resource in time domain, and improve spectrum utilization.

Optionally, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

Based on the embodiment shown in FIG. 3, in an optional implementation, before step 301, the method may further include:
sending configuration information of the target information.

It should be noted that the target time-domain resource of the first OFDM symbol includes a time-domain resource of the at least one sub symbol. It may be understood that the cyclic prefix time before the first OFDM symbol is divided may be partially occupied to transmit information on a sub symbol, as shown in FIG. 4; or may be completely occupied to transmit information on a sub symbol.

Optionally, one sub symbol of the first OFDM symbol is used to transmit information that corresponds to an available signal region before the first OFDM symbol is divided into the at least two sub symbols. For example, the sub symbol 1 in FIG. 4 and FIG. 5 is used to transmit the information that corresponds to the available signal region before the first OFDM symbol is divided into the at least two sub symbols.

Optionally, a particular sub symbol, of the first OFDM symbol, used to transmit the information that corresponds to the available signal region before the first OFDM symbol is divided into the at least two sub symbols is used as a symbol represented by an index (for example, symbol #0) of the first OFDM symbol. In other words, the index, indicated in signal or channel configuration, of the first OFDM symbol represents the particular sub symbol by default.

Optionally, the target information includes at least one of following:
at least a part of content of a specific reference signal;
at least a part of content of a channel; or
information that corresponds to an available signal region before the first OFDM symbol is divided into the at least two sub symbols.

It should be noted that for different transmitted information, corresponding configuration information is also different. Time-domain configuration of a channel state information-reference signal (CSI-RS) and time-domain configuration of a demodulation reference signal (DM-RS) in NR Rel 15 FR1 & FR2 are briefly described below.

For the time-domain configuration of the CSI-RS, In the NR Rel 15 FR1 & FR2, a periodic CSI-RS, a semi-static CSI-RS, and a non-periodic CSI-RS may be configured.

For the periodic and semi-static configuration, a position of a slot in which the CSI-RS is transmitted is configured by indicating period-level and slot-level time offsets by using a higher layer. Optionally, a time-frequency position of the CSI-RS in the slot is configured by indicating a CSI-RS mapping solution. First, l0(=0-13), l1(=2-13), and a table lookup index are obtained through higher layer configuration. Then, a symbol position of the CSI-RS is obtained by using a physical layer mapping table. The semi-static CSI-RS may be activated or deactivated by using a MAC CE or special DCI 0_1.

For non-periodic configuration, a position of a slot used to send the CSI-RS is obtained by using a position of a slot of downlink control information (DCI) and a slot-level offset that is configured at a higher layer. Similarly, a time-frequency position of the CSI-RS in the slot is obtained in a manner the same as that for the periodic configuration and the semi-static configuration.

Herein, the CSI-RS may be used for channel state obtaining, beam management, and time-frequency tracking.

For the time-domain configuration of the DM-RS, In the NR Rel 15 FR1 & FR2, the DM-RS is divided into a pre-DM-RS and an additional DM-RS.

For a pre-DM-RS of a physical downlink shared channel (PDSCH), a position of a DM-RS of a type A PDSCH is indicated by using a physical broadcast channel (PBCH), and may be a third OFDM symbol or a fourth OFDM symbol, and a position of a DM-RS of a type B PDSCH starts from a first symbol of a scheduling PDSCH (if the PDSCH conflicts with a control resource set (CORESET), the position starts from a symbol following the CORESET).

For an additional DM-RS of the PDSCH, an additional DM-RS value of radio resource control (RRC) configuration is obtained, and a time-domain position of the additional DM-RS may be obtained after table lookup is performed by using a type of a scheduling PDSCH and a time-domain length.

Optionally, the target information includes at least one of entire content of a specific reference signal or entire content of a channel; and
correspondingly, the configuration information includes at least one of following:
a type of a signal or a channel;
a period and an offset of the first OFDM symbol;
a mapping time-frequency position of the signal or the channel;
a sending manner of the signal or the channel; or an antenna sending manner of the signal or the channel.

It should be noted that the period and the offset of the first OFDM symbol may be understood as that the first OFDM symbol appears at a period T, and time granularities of the period and the offset are T.

The signal or channel may be sent in a periodic manner, a semi-static manner, or a non-periodic manner.

Optionally, for the periodic sending manner, a base station or a terminal UE may perform sending based on configuration; for the semi-static manner, activation and deactivation are performed by using first OFDM symbol activation signaling in DCI or a MAC CE; for the non-periodic manner, sending is performed by using a sending request field of the first OFDM symbol in DCI or a MAC CE. When the sending request field of the first OFDM symbol in the DCI or the MAC CE is true, sending is performed, based on configuration, for a latest first OFDM symbol meeting a preset time sequence requirement.

The antenna sending manner of the signal or the channel is, for example, configuration at an antenna port of each sub symbol or at beamforming.

Herein, the sending configuration information of the target information may include:

sending the configuration information of the target information based on a configuration signaling unit of the first OFDM symbol.

Herein, optionally, the target information includes at least one of entire content of a specific reference signal or entire content of a channel. In other words, the sub symbol is independently configured for at least one of the specific reference signal or channel.

Herein, the configuration information of the target information is sent based on a configuration signaling unit of the first OFDM symbol. For example, cell-specific configuration or UE-specific configuration is performed for at least one of all content of the specific reference signal or all content of the channel. Herein, Optionally, the configuration information of the target information may be sent based on the sending signaling unit of the first OFDM symbol.

Figure 7:
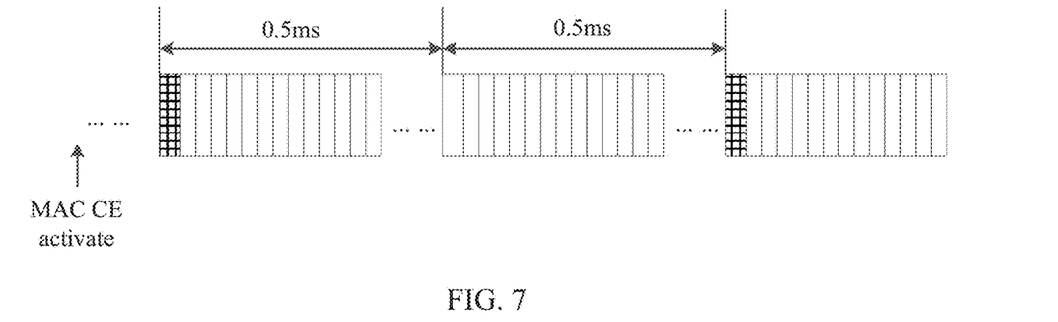
FIG. 7 is a schematic diagram of a sending status of sending information on a sub symbol 2 in FIG. 5 based on a configuration signaling unit.

In an example, still referring to FIG. 5, it is assumed that 0.96 MHz sub-carrier space is used, and information is sent on the first OFDM symbol that appears every 0.5 ms in the NR system. Herein, the first OFDM symbol includes the sub symbol 1 and the sub symbol 2. In other words, the first OFDM symbol is divided into the two sub symbols. A signaling unit, namely, sending configuration of the first OFDM symbol (for example, special Symbol TxConfig) is added at RRC. A configuration sending signal is the CSI-RS, a sending period is two times the period of the first OFDM symbol, time-frequency resource mapping configuration is sending on a full bandwidth even-numbered sub-carrier, and a configuration sending type is semi-static sending. Then, a sending status of the signal is shown in FIG. 7. In FIG. 7, when a user is activated to transmit the CSI-RS on a MAC CE, the user sends the CSI-RS periodically on the first OFDM symbol based on configuration. In FIG. 7, a part filled with squares is used to indicate the sub symbol 2 or a sub symbol (1+2).

Optionally, the target information includes at least one of a part of content of a specific reference signal or a part of content of a channel; and correspondingly, the configuration information further includes:

indication information, where the indication information is used to indicate a sub symbol used to transmit the target information.

Herein, that the target information includes at least one of a part of the specific reference signal or a part of the channel indicates that the sub symbol and another OFDM symbol are configured for at least one of the specific reference signal or the channel. In other words, the sub symbol in this embodiment and another OFDM symbol are used together to transmit at least one of the specific reference signal or the channel.

Optionally, the indication information is information in a sub symbol indication domain, or the indication information is a symbol index value other than a symbol index value of an OFDM symbol in a same time unit.

Herein, the indication information may be implemented in the foregoing two manners. In one manner, the sub symbol indication domain is added in the configuration information. In other words, when the first OFDM symbol is configured, the sub symbol indication domain is effective, and indicates whether the symbol is in the configured signal or channel.

Optionally, assuming that the first OFDM symbol includes L sub symbols, in other words, the first OFDM symbol is divided into L sub symbols, it may be indicated, by using L bits, whether a configured sub symbol index is enabled, or compression indication is performed by using L' (L'<L) bits based on a needed status (for example, a scenario in which it may be used).

Figure 8:
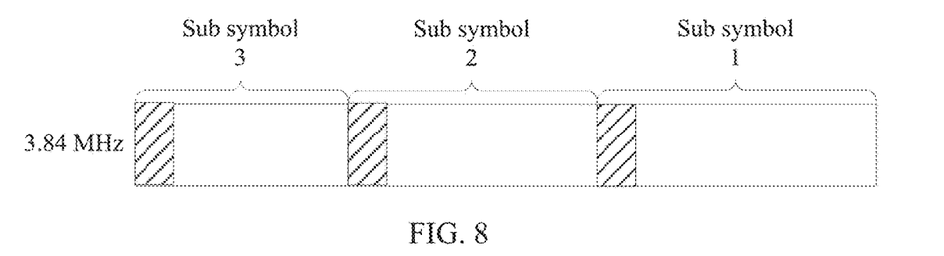
FIG. 8 is a schematic structural diagram of a first OFDM symbol using 3.84 MHz sub-carrier space according to some embodiments of the present disclosure.

In an example, as shown in FIG. 8, it is assumed that 3.84 MHz sub-carrier space is used, and information is sent on the first OFDM symbol that appears every 0.5 ms in the NR system. Herein, the first OFDM symbol includes the sub symbol 1, the sub symbol 2, and the sub symbol 3. In other words, the first OFDM symbol is divided into the three sub symbols. When the configured signal includes the first OFDM symbol (namely, symbol #0 of a special slot), a new sub symbol indication domain is added, to indicate a sub symbol index.

Figure 9:
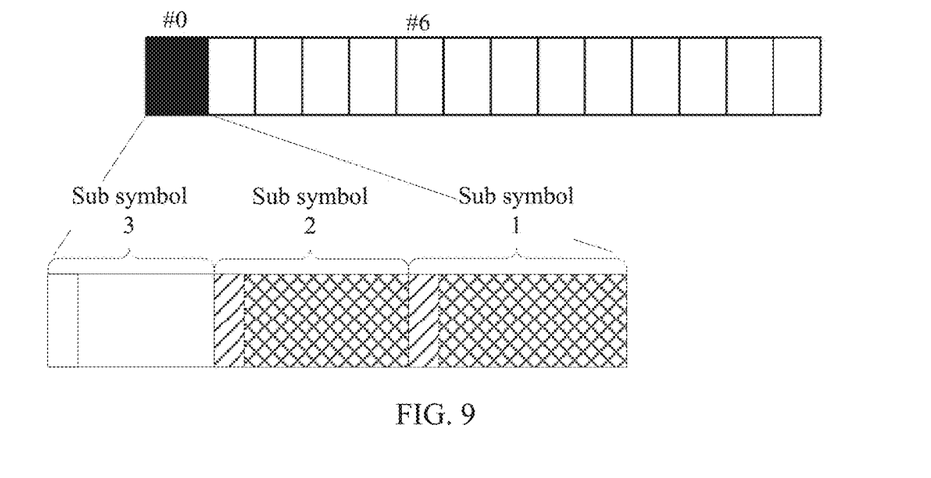
FIG. 9 is a schematic diagram of a sending status of sending information on a sub symbol of the first OFDM symbol in FIG. 8 and another OFDM symbol based on information configured in a sub symbol indication domain.

Optionally, in manner 1, it may be indicated, by using 3 bits, whether the sub symbol 1, the sub symbol 2, and the sub symbol 3 are configured. Optionally, when symbol #0 and symbol #6 in the slot are triggered by using DCI, to send a sounding reference signal (SRS), the sub symbol indication domain is effective, and the indication is 110, that is, the SRS is sent on the sub symbol 1 and the sub symbol 2, and is not sent on the sub symbol 3. A status of sending the SRS in the slot is shown in FIG. 9. In FIG. 9, the sub symbol 1 and the sub symbol 2 in the symbol #0 are used together with the symbol #6, to send the SRS.

In manner 2, a scenario in which it may be used may be indicated by using 2 bits, namely, the sub symbol 1, the sub symbol 1 plus the sub symbol 2, the sub symbol 2 plus the sub symbol 3, and the sub symbol 1 plus the sub symbol 2 plus the sub symbol 3.

In another example, still referring to FIG. 8, it is assumed that 3.84 MHz sub-carrier space is used, and information is sent on the first OFDM symbol that appears every 0.5 ms in the NR system. If the information includes at least a part of the channel, information such as a PBCH may be defined for the sub symbol 2 and the sub symbol 3 of the first OFDM symbol, to transmit downlink system information. For example, the sub symbol 3 is used to send a reference signal, and the sub symbol 2 is used to send system information. A resource mapping manner of the system information is specified by a protocol or is included in other system information.

Optionally, the sub symbol 2 and the sub symbol 3 may be configured as a detection symbol of a PDCCH or a GC-PDCCH, to perform data scheduling.

Based on the embodiment shown in FIG. 3, in an optional implementation, step 301 may include:
in a case that the at least one sub symbol includes a target sub symbol, sending the target information on the target sub symbol in a frequency-domain interleaved allocation manner or a target sub-carrier space manner, where a time-domain length of a signal part of the target sub symbol is less than a time-domain length of a signal part of a second OFDM symbol in a same frame structure, a cyclic prefix time of the second OFDM symbol is less than a cyclic prefix time before the first OFDM symbol is divided into the at least two sub symbols, and the target sub-carrier space is greater than sub-carrier space of the second OFDM symbol.

It should be noted that the time-domain length of the signal part of the target sub symbol is less than the time-domain length of the signal part of the second OFDM symbol in the same frame structure. In other words, a sampling quantity M of the signal part of the target sub symbol is less than a sampling quantity N of the signal part of the second OFDM symbol.

Herein, the target sub symbol is mapped in frequency domain in a particular interleaved manner, namely, a frequency-domain interleaved allocation manner, so that time-frequency conversion can be performed through M-point IFFT/FFT.

Optionally, when the first OFDM symbol is configured as an uplink symbol or a flexible symbol, the target information includes at least one of following:
a primary synchronization signal PSS;
a secondary synchronization signal SSS;
a CSI-RS;
a DM-RS;
a phase-tracking reference signal (PT-RS);
a newly defined signal;
a PDCCH;
a PDSCH;
a PBCH; or
a newly defined channel.

Optionally, when the first OFDM symbol is configured as a downlink symbol or a flexible symbol, the target information includes at least one of following:
an SRS;
a DM-RS;
a PT-RS;
a newly defined signal;
a physical uplink control channel (PUCCH);
a physical uplink shared channel (PUSCH); or
a newly defined channel.

In the information transmission method according to some embodiments of the present disclosure, the target information is sent on the at least one sub symbol of the first OFDM symbol, where the first OFDM symbol includes the at least two sub symbols. In this way, the information is sent on the at least one sub symbol in the at least two sub symbols obtained by dividing the first OFDM symbol, to effectively improve an unnecessary waste of a periodic long-CP resource in time domain, and improve spectrum utilization.

Figure 10:
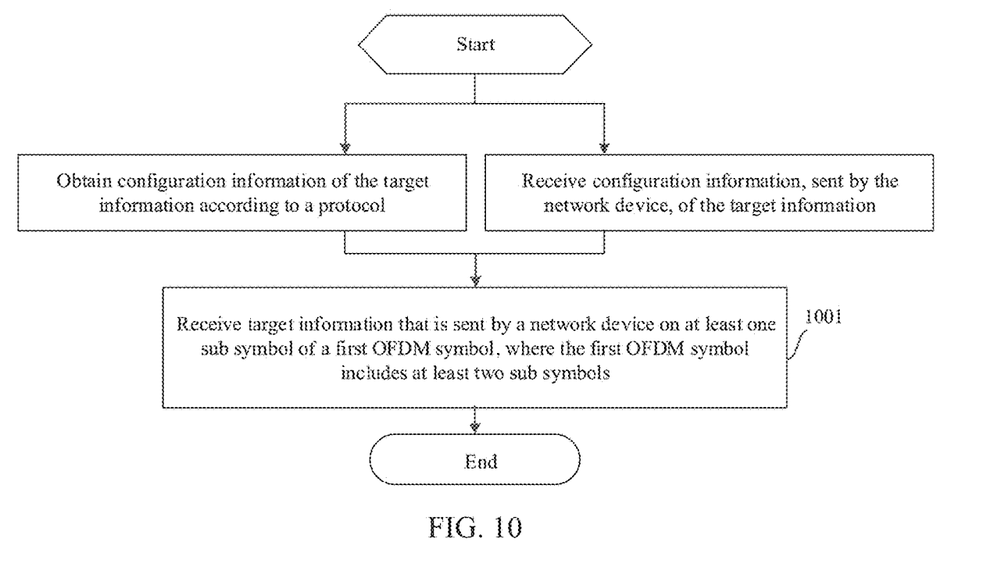
FIG. 10 is a second schematic flowchart of an information transmission method according to some embodiments of the present disclosure.

As shown in FIG. 10, some embodiments of the present disclosure further provide an information transmission method, applied to a terminal, and including:
step 1001. Receive target information that is sent by a network device on at least one sub symbol of a first OFDM symbol, where the first OFDM symbol includes at least two sub symbols.

Optionally, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

Based on the embodiment shown in FIG. 10, in an optional implementation, before step 1001, the method further includes:
obtaining configuration information of the target information according to a protocol; or
receiving configuration information, sent by the network device, of the target information.

It should be noted that the terminal may determine a sending method of the target information based on the obtained configuration information of the target information, for example, a sending manner of the information, or an antenna sending manner of the information.

Optionally, the target information includes:
at least a part of content of a specific reference signal;
at least a part of content of a channel; and
information that corresponds to an available signal region before the first OFDM symbol is divided into the at least two sub symbols.

Optionally, the target information includes at least one of entire content of a specific reference signal or entire content of a channel; and
correspondingly, the configuration information includes at least one of following:
a type of a signal or a channel;
a period and an offset of the first OFDM symbol;
a mapping time-frequency position of the signal or the channel;
a sending manner of the signal or the channel; or
an antenna sending manner of the signal or the channel.

Optionally, the target information includes at least one of a part of content of a specific reference signal or a part of content of a channel; and
correspondingly, the configuration information further includes:
indication information, where the indication information is used to indicate a sub symbol used to transmit the information.

Optionally, the indication information is information in a sub symbol indication domain; or
the indication information is a symbol index value other than a symbol index value of an OFDM symbol in a same time unit.

According to the information transmission method in some embodiments of the present disclosure, the target information that is sent by the network device on the at least one sub symbol of the first OFDM symbol is received. The first OFDM symbol includes the at least two sub symbols. In this way, information sent on at least one sub symbol in at least two sub symbols obtained by dividing the first OFDM symbol is received, to effectively improve an unnecessary waste of a periodic long-CP resource in time domain, and improve spectrum utilization.

Figure 11:
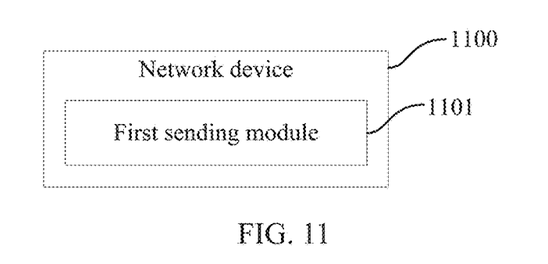
FIG. 11 is a schematic diagram of modules of a network device according to some embodiments of the present disclosure.

FIG. 11 is a schematic diagram of modules of a network device according to some embodiments of the present disclosure. A network device 1100 in some embodiments of the present disclosure includes:
a first sending module 1101, configured to send target information on at least one sub symbol of a first OFDM symbol, where
the first OFDM symbol includes at least two sub symbols.

In the network device in some embodiments of the present disclosure, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

The network device in some embodiments of the present disclosure further includes:
 a second sending module, configured to send configuration information of the target information.

In the network device in some embodiments of the present disclosure, the second sending module further includes:
 a first sending unit, configured to send the configuration information of the target information according to a protocol or based on a configuration signaling unit of the first OFDM symbol.

In the network device in some embodiments of the present disclosure, the target information includes at least one of following:
 at least a part of content of a specific reference signal;
 at least a part of content of a channel; or
 information that corresponds to an available signal region before the first OFDM symbol is divided into the at least two sub symbols.

In the network device in some embodiments of the present disclosure, the target information includes at least one of entire content of a specific reference signal or entire content of a channel; and
 the configuration information includes at least one of following:
 a type of a signal or a channel;
 a period and an offset of the first OFDM symbol;
 a mapping time-frequency position of the signal or the channel;
 a sending manner of the signal or the channel; or
 an antenna sending manner of the signal or the channel.

In the network device in some embodiments of the present disclosure, the target information includes at least one of a part of content of a specific reference signal or a part of content of a channel; and
 the configuration information further includes:
 indication information, where the indication information is used to indicate a sub symbol used to transmit the target information.

In the network device in some embodiments of the present disclosure, the indication information is information in a sub symbol indication domain; or
 the indication information is a symbol index value other than a symbol index value of an OFDM symbol in a same time unit.

In the network device in some embodiments of the present disclosure, the first sending module 1101 includes:
 a second sending unit, configured to: in a case that the at least one sub symbol includes a target sub symbol, send the target information on the target sub symbol in a frequency-domain interleaved allocation manner or a target sub-carrier space manner, where a time-domain length of a signal part of the target sub symbol is less than a time-domain length of a signal part of a second OFDM symbol in a same frame structure, a cyclic prefix time of the second OFDM symbol is less than a cyclic prefix time before the first OFDM symbol is divided into the at least two sub symbols, and the target sub-carrier space is greater than sub-carrier space of the second OFDM symbol.

In the network device in some embodiments of the present disclosure, a time-domain length of each sub symbol is specified by a protocol or configured by a network.

In the network device in some embodiments of the present disclosure, the first sending module sends the target information on the at least one sub symbol of the first OFDM symbol, where the first OFDM symbol includes the at least two sub symbols. In this way, the information is sent on the at least one sub symbol in the at least two sub symbols obtained by dividing the first OFDM symbol, to effectively improve an unnecessary waste of a periodic long-CP resource in time domain, and improve spectrum utilization.

Some embodiments of the present disclosure further provide a network device, including a memory, a processor, and a computer program that is stored in the memory and that can run on the processor. When the computer program is executed by the processor, each process of the information transmission method embodiment applied to the network device can be implemented, and a same technical effect can be achieved. To avoid repetition, details are not described herein again.

Some embodiments of the present disclosure further provide a non-transitory computer-readable storage medium. A computer program is stored in the non-transitory computer-readable storage medium. When the computer program is executed by a processor, the processes of the information transmission method embodiment applied to the network device are implemented, and a same technical effect can be achieved. To avoid repetition, details are not described herein again. The non-transitory computer-readable storage medium may be a read-only memory (ROM), a random access memory (RAM), a magnetic disk, an optical disc, or the like.

Figure 12:
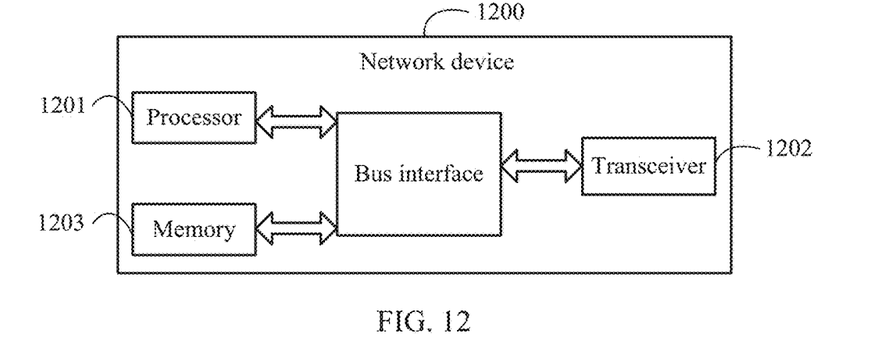
FIG. 12 is a structural block diagram of a network device according to some embodiments of the present disclosure.

As shown in FIG. 12, some embodiments of the present disclosure further provide a network device 1200, including a processor 1201, a transceiver 1202, a memory 1203, and a bus interface. The transceiver 1202 is configured to:
 send target information on at least one sub symbol of a first OFDM symbol, where
 the first OFDM symbol includes at least two sub symbols.

In FIG. 12, the bus architecture may include any quantity of interconnected buses and bridges, which are connected together by various circuits of one or more processors represented by the processor 1201 and a memory represented by the memory 1203. The bus architecture may further connect various other circuits such as peripheral devices, voltage regulators, and power management circuits, which are all known in the art, and therefore, no further description is given herein. The bus interface provides an interface. The transceiver 1202 may be a plurality of components. To be specific, the transceiver 1202 includes a transmitter and a receiver, and provides a unit configured to communicate with various other apparatuses on a transmission medium.

Optionally, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

Optionally, the processor 1201 is configured to read the program in the memory 1203 to perform the following process:
 sending configuration information of the target information, where a time-domain resource of the first OFDM symbol includes a time-domain resource of the at least one sub symbol, and the target time-domain resource is a time-domain resource that is used to transmit a cyclic prefix before the first OFDM symbol is divided into the at least two sub symbols.

Optionally, the processor 1201 is configured to read the program in the memory 1203 to further perform the following process:

sending the configuration information of the target information based on a configuration signaling unit of the first OFDM symbol.

Optionally, the target information includes at least one of following:
at least a part of content of a specific reference signal;
at least a part of content of a channel; or
information that corresponds to an available signal region before the first OFDM symbol is divided into the at least two sub symbols.

Optionally, the target information includes at least one of entire content of a specific reference signal or entire content of a channel; and
the configuration information includes at least one of following:
a type of a signal or a channel;
a period and an offset of the first OFDM symbol;
a mapping time-frequency position of the signal or the channel;
a sending manner of the signal or the channel; or
an antenna sending manner of the signal or the channel.

Optionally, the target information includes at least one of a part of content of a specific reference signal or a part of content of a channel; and
the configuration information further includes:
indication information, where the indication information is used to indicate a sub symbol used to transmit the target information.

Optionally, the indication information is information in a sub symbol indication domain; or
the indication information is a symbol index value other than a symbol index value of an OFDM symbol in a same time unit.

Optionally, the processor 1201 is configured to read the program in the memory 1203 to further perform the following process:
in a case that the at least one sub symbol includes a target sub symbol, sending the target information on the target sub symbol in a frequency-domain interleaved allocation manner or a target sub-carrier space manner, where a time-domain length of a signal part of the target sub symbol is less than a time-domain length of a signal part of a second OFDM symbol in a same frame structure, a cyclic prefix time of the second OFDM symbol is less than a cyclic prefix time before the first OFDM symbol is divided into the at least two sub symbols, and the target sub-carrier space is greater than sub-carrier space of the second OFDM symbol.

Optionally, a time-domain length of each sub symbol is specified by a protocol or configured by a network.

In the network device in some embodiments of the present disclosure, the target information is sent on the at least one sub symbol of the first OFDM symbol, where the first OFDM symbol includes the at least two sub symbols. In this way, the information is sent on the at least one sub symbol in the at least two sub symbols obtained by dividing the first OFDM symbol, to effectively improve an unnecessary waste of a periodic long-CP resource in time domain, and improve spectrum utilization.

Figure 13:
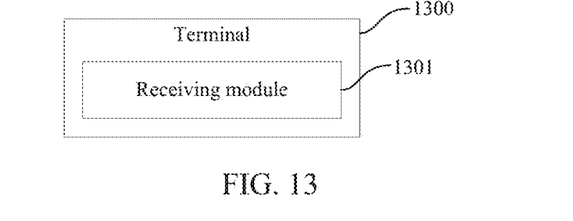
FIG. 13 is a schematic diagram of modules of a terminal according to some embodiments of the present disclosure.

FIG. 13 is a schematic diagram of modules of a terminal according to some embodiments of the present disclosure. As shown in FIG. 13, a terminal 1300 provided in this embodiment of the present disclosure includes:
a receiving module 1301, configured to receive target information that is sent by a network device on at least one sub symbol of a first OFDM symbol, where the first OFDM symbol includes at least two sub symbols.

In the terminal in some embodiments of the present disclosure, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

The terminal in some embodiments of the present disclosure further includes:
an obtaining module, configured to obtain configuration information of the target information according to a protocol; or receive configuration information, sent by a network device, of the target information.

In the terminal in some embodiments of the present disclosure, the target information includes:
at least a part of content of a specific reference signal;
at least a part of content of a channel; and
information that corresponds to an available signal region before the first OFDM symbol is divided into the at least two sub symbols.

In the terminal in some embodiments of the present disclosure, the target information includes at least one of entire content of a specific reference signal or entire content of a channel; and
the configuration information includes at least one of following:
a type of a signal or a channel;
a period and an offset of the first OFDM symbol;
a mapping time-frequency position of the signal or the channel;
a sending manner of the signal or the channel; or
an antenna sending manner of the signal or the channel.

In the terminal in some embodiments of the present disclosure, the target information includes at least one of a part of content of a specific reference signal or a part of content of a channel; and
the configuration information further includes:
indication information, where the indication information is used to indicate a sub symbol used to transmit the target information.

In the terminal in some embodiments of the present disclosure, the indication information is information in a sub symbol indication domain; or
the indication information is a symbol index value other than a symbol index value of an OFDM symbol in a same time unit.

According to the terminal in some embodiments of the present disclosure, the receiving module receives the target information that is sent by the network device on the at least one sub symbol of the first OFDM symbol. The first OFDM symbol includes the at least two sub symbols. In this way, the information sent on the at least one sub symbol in the at least two sub symbols obtained by dividing the first OFDM symbol is received, to effectively improve an unnecessary waste of a periodic long-CP resource in time domain, and improve spectrum utilization.

An embodiment of the present disclosure further provides a terminal, including: a memory, a processor, and a computer program that is stored in the memory and executable on the processor. When the computer program is executed by the processor, the processes of the information transmission method embodiment applied to the terminal are implemented, and a same technical effect can be achieved. To avoid repetition, details are not described herein again.

Some embodiments of the present disclosure further provide a non-transitory computer-readable storage medium. A computer program is stored in the non-transitory computer-readable storage medium. When the computer program is executed by a processor, the processes of the information transmission method embodiment applied to the terminal are implemented, and a same technical effect can be achieved. To avoid repetition, details are not described herein again. The non-transitory computer-readable storage medium is, for example, a read-only memory (ROM), a random access memory (RAM), a magnetic disk, an optical disc, or the like.

Figure 14:
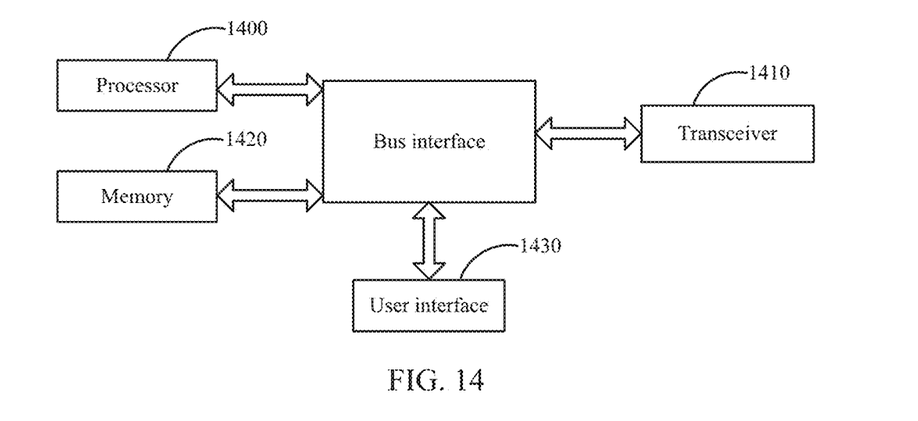
FIG. 14 is a first structural block diagram of a terminal according to some embodiments of the present disclosure.

To better achieve the foregoing objectives, as shown in FIG. 14, an embodiment of the present disclosure further provides a terminal, including a memory 1420, a processor 1400, a transceiver 1410, a user interface 1430, a bus interface, and a computer program that is stored in the memory 1420 and executable on the processor 1400. The transceiver 1410 is configured to:

receive target information that is sent by a network device on at least one sub symbol of a first OFDM symbol, where the first OFDM symbol includes at least two sub symbols.

In FIG. 14, a bus architecture may include any quantity of interconnected buses and bridges, which are connected together by various circuits of one or more processors represented by the processor 1400 and a memory represented by the memory 1420. The bus architecture may further connect together various other circuits of a peripheral device, a voltage stabilizer, a power management circuit, and the like, which are known in this art and will not be further described herein. The bus interface provides an interface. The transceiver 1410 may include a plurality of elements, that is, include a transmitter and a receiver, and provide units for communication with various other apparatuses on a transmission medium. For different user equipment, the user interface 1430 may alternatively be an interface for externally or internally connecting needed device. The connected device includes but is not limited to a keypad, a display, a loudspeaker, a microphone, and a joystick.

The processor 1400 is responsible for managing the bus architecture and common processing, and the memory 1420 may store data used when the processor 1400 performs an operation.

Optionally, a time-domain resource of the at least one sub symbol is a part or all of a target time-domain resource, and the target time-domain resource is a time-domain resource that is used to transmit a cyclic prefix before the first OFDM symbol is divided into the at least two sub symbols.

Optionally, the transceiver 1410 is further configured to:
obtain configuration information of the target information according to a protocol; or receive configuration information, sent by the network device, of the target information.

Optionally, the target information includes:
at least a part of content of a specific reference signal;
at least a part of content of a channel; and
information that corresponds to an available signal region before the first OFDM symbol is divided into the at least two sub symbols.

Optionally, the target information includes at least one of entire content of a specific reference signal or entire content of a channel; and the configuration information includes at least one of following:
a type of a signal or a channel;
a period and an offset of the first OFDM symbol;
a mapping time-frequency position of the signal or the channel;
a sending manner of the signal or the channel; or
an antenna sending manner of the signal or the channel.

Optionally, the target information includes at least one of a part of content of a specific reference signal or a part of content of a channel; and the configuration information further includes:
indication information, where the indication information is used to indicate a sub symbol used to transmit the target information.

Optionally, the indication information is information in a sub symbol indication domain; or the indication information is a symbol index value other than a symbol index value of an OFDM symbol in a same time unit.

According to the terminal in some embodiments of the present disclosure, the target information that is sent by the network device on the at least one sub symbol of the first OFDM symbol is received. The first OFDM symbol includes the at least two sub symbols. In this way, the information sent on the at least one sub symbol in the at least two sub symbols obtained by dividing the first OFDM symbol is received, to effectively improve an unnecessary waste of a periodic long-CP resource in time domain, and improve spectrum utilization.

The terminal provided in some embodiments of the present disclosure can implement the processes of the information transmission method embodiment, and a same technical effect can be achieved. To avoid repetition, details are not described again herein.

Figure 15:
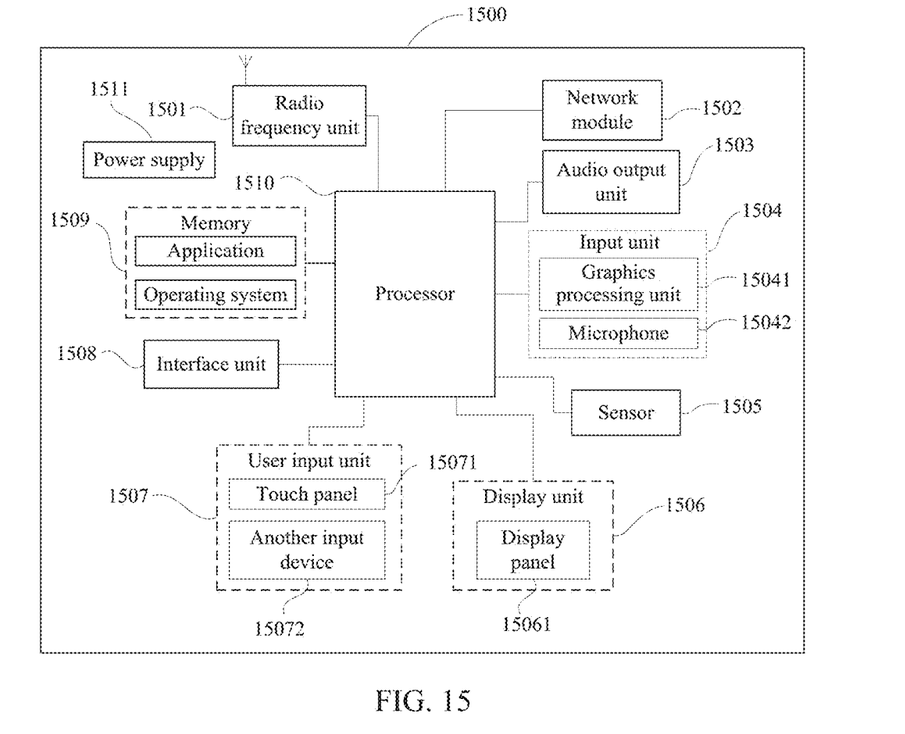
FIG. 15 is a second structural block diagram of a terminal according to some embodiments of the present disclosure.
Figure 16:
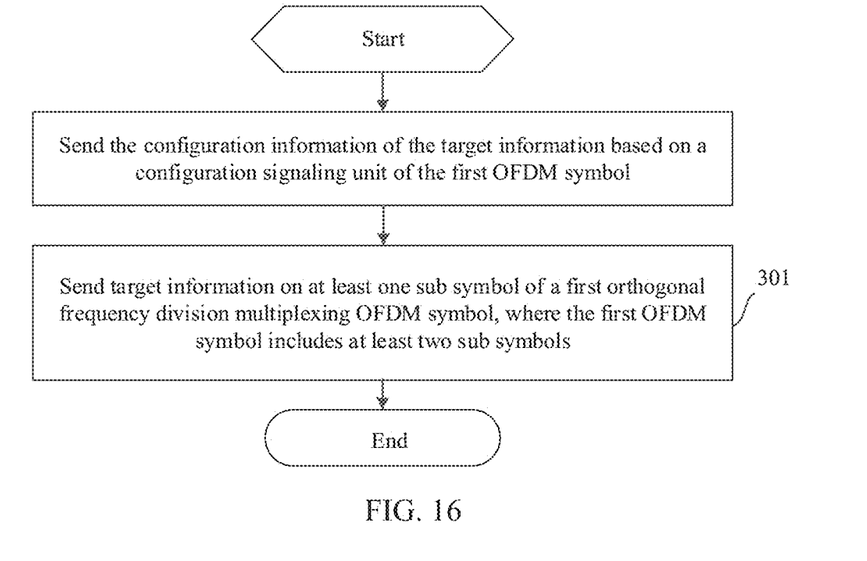

FIG. 15 is a schematic diagram of a hardware structure of a terminal implementing the embodiments of the present disclosure. The terminal 1500 includes, but is not limited to: a radio frequency unit 1501, a network module 1502, an audio output unit 1503, an input unit 1504, a sensor 1505, a display unit 1506, a user input unit 1507, an interface unit 1508, a memory 1509, a processor 1510 and a power supply 1511. A person skilled in the art may understand that the structure of the terminal in FIG. 15 does not constitute a limitation on the terminal, and the terminal may include more or fewer components than those shown in the figure, or some components may be combined, or a different component arrangement may be used. In some embodiments of the present disclosure, the terminal includes but is not limited to a mobile phone, a tablet computer, a notebook computer, a palmtop computer, an in-vehicle terminal, a wearable device, and a pedometer.

The radio frequency unit 1501 is configured to receive target information that is sent by a network device on at least one sub symbol of a first OFDM symbol, where the first OFDM symbol includes at least two sub symbols.

According to the technical solutions in some embodiments of the present disclosure, the information sent on the at least one sub symbol in the at least two sub symbols obtained by dividing the first OFDM symbol is received, to effectively improve an unnecessary waste of a periodic long-CP resource in time domain, and improve spectrum utilization.

It should be understood that in some embodiments of the present disclosure, the radio frequency unit 1501 may be configured to receive and send information, or receive and send signals in a call process. Optionally, after receiving downlink data from the network device, the radio frequency unit 1501 sends the downlink data to the processor 1510 for processing. In addition, the radio frequency unit 1501 sends uplink data to the network device. Usually, the radio frequency unit 1501 includes but is not limited to: an antenna, at least one amplifier, a transceiver, a coupler, a low noise amplifier, and a duplexer. In addition, the radio frequency unit 1501 may also communicate with a network and another device by using a wireless communications system.

The terminal provides wireless broadband Internet access to a user through the network module 1502, for example, helps the user receive and send e-mails, browse web pages, and access streaming media.

The audio output unit 1503 may convert audio data received by the radio frequency unit 1501 or the network module 1502 or stored in the memory 1509 into an audio signal, and output the audio signal into a sound. Moreover, the audio output unit 1503 may provide audio output related to a specific function performed by the terminal 1500 (such as a call signal reception sound, a message reception sound, or the like) as well. The audio output unit 1503 includes a loudspeaker, a buzzer, a receiver, and the like.

The input unit 1504 is configured to receive audio or video signals. The input unit 1504 may include a graphics processing unit (GPU) 15041 and a microphone 15042. The graphics processing unit 15041 is configured to process image data of a static picture or a video obtained by an image capture apparatus (for example, a camera) in a video capture mode or an image capture mode. A processed image frame may be displayed on the display unit 1506. The image frame processed by the graphics processing unit 15041 may be stored in the memory 1509 (or other storage mediums) or sent by using the radio frequency unit 1501 or the network module 1502. The microphone 15042 may receive a sound and can process such sound into audio data. Processed audio data can be converted, in telephone call mode, into a format that can be sent to a mobile communication network device via the radio frequency unit 1501 for output.

The terminal 1500 further includes at least one sensor 1505, for example, a light sensor, a motion sensor, and another sensor. Optionally, the light sensor includes an ambient light sensor and a proximity sensor, where the ambient light sensor can adjust brightness of a display panel 15061 based on brightness of ambient light, and the proximity sensor can turn off the display panel 15061 and/or backlight when the terminal 1500 is moved towards the ear. As a type of a motion sensor, an accelerometer sensor may detect acceleration values in directions (that are generally three axes), and detect a value and a direction of gravity when the accelerometer sensor is static, and may be configured to: recognize user equipment posture (for example, screen switching between landscape and portrait modes, a related game, or magnetometer posture calibration), and perform a function related to vibration recognition (for example, a pedometer or a knock), and the like. The sensor 1505 may further include a fingerprint sensor, a pressure sensor, an iris sensor, a molecular sensor, a gyroscope, a barometer, a hygrometer, a thermometer, an infrared sensor, and the like. Details are not described herein.

The display unit 1506 is configured to display information entered by a user or information provided for the user. The display unit 1506 may include a display panel 15061. The display panel 15061 may be configured in a form of a liquid crystal display (LCD), an organic light-emitting diode (OLED), or the like.

The user input unit 1507 may be configured to receive input numeric or character information, and generate key signal inputs related to user settings and function control of the user equipment. Optionally, the user input unit 1507 includes a touch panel 15071 and another input device 15072. The touch panel 15071, also referred to as a touchscreen, may collect a touch operation performed by a user on or near the touch panel 15071 (such as an operation performed by a user on the touch panel 15071 or near the touch panel 15071 by using any proper object or accessory, such as a finger or a stylus). The touch panel 15071 may include two parts: a touch detection device and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1510, and receives and executes a command from the processor 1510. In addition, the touch panel 15071 may be implemented in various forms, such as a resistance type, a capacitance type, an infrared ray and a surface acoustic wave. In addition to the touch panel 15071, the user input unit 1507 may further include another input device 15072. Optionally, the another input device 15072 may include but is not limited to: a physical keyboard, a function key (such as a volume control key, a switch key), a trackball, a mouse, and a joystick. Details are not described herein.

Optionally, the touch panel 15071 may cover the display panel 15061. When detecting a touch operation on or near the touch panel 15071, the touch panel 15071 transmits the touch operation to the processor 1510 to determine a type of a touch event. Then the processor 1510 provides corresponding visual output on the display panel 15061 based on the type of the touch event. Although in FIG. 15, the touch panel 15071 and the display panel 15061 are two independent components to implement input and output functions of the terminal, but the touch panel 15071 and the display panel 15061 may be integrated to implement the input and output functions of the terminal in some embodiments, which is not specifically limited herein.

The interface unit 1508 is an interface connecting an external apparatus and the terminal 1500. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 1508 may be configured to receive an input (such as data information or electric power) from the external device and transmit the received input to one or more elements within the terminal 1500, or the interface unit 1508 may be configured to transmit data between the terminal 1500 and the external apparatus.

The memory 1509 may be configured to store a software program and various data. The memory 1509 may primarily include a program storage area and a data storage area, where the program storage area may store an operating system, an application (such as a sound playing function, an image playing function) required for at least one function, and the like; and the data storage area may store data (such as audio data, a phone book) created based on the use of a mobile phone. In addition, the memory 1509 may include a high-speed random access memory or a nonvolatile memory, for example, at least one disk storage device, a flash memory, or another volatile solid-state storage device.

The processor 1510 is a control center of the terminal, and is connected to all parts of the entire terminal by using various interfaces and lines, and performs various functions of the terminal and processes data by running or executing the software program and/or a module that are stored in the memory 1509 and invoking the data stored in the memory 1509, to implement overall monitoring on the terminal. The processor 1510 may include one or more processing units. Optionally, the processor 1510 may integrate an application processor and a modem processor. The application processor mainly deals with an operating system, a user interface, and an application. The modem processor mainly deals with wireless communication. It may be understood that the modem processor may alternatively not be integrated in the processor 1510.

The terminal 1500 may further include the power supply 1511 (for example, a battery) configured to supply power to various components. Optionally, the power supply 1511 may be logically connected to the processor 1510 by using a power management system, to implement functions such as managing charging, discharging, and power consumption by using the power management system.

In addition, the terminal 1500 includes some function modules not shown, and details are not described herein.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

According to the foregoing descriptions of the implementations, a person skilled in the art may clearly understand that the foregoing method in the embodiments may be implemented by software plus a required universal hardware platform, or clearly may alternatively be implemented by hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

It may be understood that the embodiments described in some embodiments of the present disclosure may be implemented by hardware, software, firmware, middleware, microcode, or a combination thereof. For hardware implementation, a module, unit, submodule, subunit, and the like can be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, other electronic units used to perform the functions described in this application, or a combination thereof.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented in the processor or outside the processor.

Therefore, the purpose of the present disclosure may also be implemented through running a program or a group of programs on any computing apparatus. The computing apparatus may be a well-known general-purpose apparatus. Therefore, the objectives of the present disclosure can also be achieved merely by providing a program product including program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be pointed out that, in the apparatus and method of the present disclosure, obviously, various components or steps can be split and/or recombined. These decomposition and/or recombination should be regarded as an equivalent solution of the present disclosure. Moreover, the steps for performing the foregoing series of processing may be performed naturally in chronological order according to a described sequence, but do not necessarily need to be performed in chronological order, and some steps may be performed in parallel or independently.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An information transmission method, applied to a network device and comprising:
sending target information on at least one sub symbol of a first orthogonal frequency division multiplexing (OFDM) symbol, wherein
the first OFDM symbol comprises at least two sub symbols, a time-domain resource of the at least one sub symbol is a part or all of a target time-domain resource, the target time-domain resource is a time-domain resource that is used to transmit a cyclic prefix before the first OFDM symbol is divided into the at least two sub symbols, and a cyclic prefix time of the first OFDM symbol is greater than a cyclic prefix time of other OFDM symbols in the same frame structure; and
the target information comprises at least one of following:
at least a part of content of a specific reference signal;
at least a part of content of a channel; or
information that corresponds to an available signal region before the first OFDM symbol is divided into the at least two sub symbols.

2. The information transmission method according to claim 1, wherein before the sending target information on at least one sub symbol of a first OFDM symbol, the method further comprises:
sending configuration information of the target information.

3. The information transmission method according to claim 2, wherein the sending configuration information of the target information comprises:
sending the configuration information of the target information based on a configuration signaling unit of the first OFDM symbol.

4. The information transmission method according to claim 2, wherein the target information comprises at least one of entire content of a specific reference signal or entire content of a channel; and
the configuration information comprises at least one of following:
a type of a signal or a channel;
a period and an offset of the first OFDM symbol;

a mapping time-frequency position of the signal or the channel;

a sending manner of the signal or the channel; or an antenna sending manner of the signal or the channel; and/or the target information comprises at least one of a part of content of a specific reference signal or a part of content of a channel; and the configuration information comprises:

indication information, wherein the indication information is used to indicate a sub symbol used to transmit the target information.

5. The information transmission method according to claim 4, wherein the indication information is information in a sub symbol indication domain.

6. A non-transitory computer-readable storage medium, wherein the non-transitory computer-readable storage medium stores a computer program, and when the computer program is executed by a processor, the steps of the information transmission method according to claim 2 are implemented.

7. The information transmission method according to claim 1, wherein the sending target information on at least one sub symbol of a first OFDM symbol comprises:

determining that the at least one sub symbol comprises a target sub symbol, sending the target information on the target sub symbol in a frequency-domain interleaved allocation manner or a target sub-carrier space manner, wherein a time-domain length of a signal part of the target sub symbol is less than a time-domain length of a signal part of a second OFDM symbol in a same frame structure, a cyclic prefix time of the second OFDM symbol is less than a cyclic prefix time before the first OFDM symbol is divided into the at least two sub symbols, and the target sub-carrier space is greater than sub-carrier space of the second OFDM symbol.

8. The information transmission method according to claim 1, wherein a time-domain length of each sub symbol is specified by a protocol or configured by a network.

9. A non-transitory computer-readable storage medium, wherein the non-transitory computer-readable storage medium stores a computer program, and when the computer program is executed by a processor, the steps of the information transmission method according to claim 1 are implemented.

10. A network device, comprising a memory, a processor, and a computer program that is stored in the memory and executable on the processor, wherein the computer program, when executed by the processor, causes the network device to perform:

sending target information on at least one sub symbol of a first orthogonal frequency division multiplexing (OFDM) symbol, wherein the first OFDM symbol comprises at least two sub symbols, a time-domain resource of the at least one sub symbol is a part or all of a target time-domain resource, the target time-domain resource is a time-domain resource that is used to transmit a cyclic prefix before the first OFDM symbol is divided into the at least two sub symbols, and a cyclic prefix time of the first OFDM symbol is greater than a cyclic prefix time of other OFDM symbols in the same frame structure; and the target information comprises at least one of following:

at least a part of content of a specific reference signal;

at least a part of content of a channel; or information that corresponds to an available signal region before the first OFDM symbol is divided into the at least two sub symbols.

11. The network device according to claim 10, wherein the computer program, when executed by the processor, causes the network device to further perform:

sending configuration information of the target information.

12. The network device according to claim 11, wherein the computer program, when executed by the processor, causes the network device to perform:

sending the configuration information of the target information based on a configuration signaling unit of the first OFDM symbol.

13. The network device according to claim 11, wherein the target information comprises at least one of entire content of a specific reference signal or entire content of a channel; and the configuration information comprises at least one of following:

a type of a signal or a channel;

a period and an offset of the first OFDM symbol;

a mapping time-frequency position of the signal or the channel;

a sending manner of the signal or the channel; or an antenna sending manner of the signal or the channel; and/or the target information comprises at least one of a part of content of a specific reference signal or a part of content of a channel; and the configuration information comprises:

indication information, wherein the indication information is used to indicate a sub symbol used to transmit the target information.

14. The network device according to claim 13, wherein the indication information is information in a sub symbol indication domain.

15. The network device according to claim 10, wherein the computer program, when executed by the processor, causes the network device to perform:

determining that the at least one sub symbol comprises a target sub symbol, sending the target information on the target sub symbol in a frequency-domain interleaved allocation manner or a target sub-carrier space manner, wherein a time-domain length of a signal part of the target sub symbol is less than a time-domain length of a signal part of a second OFDM symbol in a same frame structure, a cyclic prefix time of the second OFDM symbol is less than a cyclic prefix time before the first OFDM symbol is divided into the at least two sub symbols, and the target sub-carrier space is greater than sub-carrier space of the second OFDM symbol.

16. The network device according to claim 10, wherein a time-domain length of each sub symbol is specified by a protocol or configured by a network.

17. A terminal, comprising a memory, a processor, and a computer program that is stored in the memory and executable on the processor, wherein the computer program, when executed by the processor, causes the terminal to perform:

receiving target information sent by a network device on at least one sub symbol of a first orthogonal frequency division multiplexing (OFDM) symbol, wherein the first OFDM symbol comprises at least two sub symbols, a time-domain resource of the at least one sub symbol is a part or all of a target time-domain resource, the target time-domain resource is a time-domain resource that is used to transmit a cyclic prefix before the first OFDM symbol is divided into the at least two sub symbols, and a cyclic prefix time of the first OFDM symbol is greater than a cyclic prefix time of other OFDM symbols in the same frame structure; and the target information comprises at least one of following:

at least a part of content of a specific reference signal;

at least a part of content of a channel; or information that corresponds to an available signal region before the first OFDM symbol is divided into the at least two sub symbols.

18. The terminal according to claim 17, wherein the computer program, when executed by the processor, causes the terminal to further perform:

obtaining configuration information of the target information according to a protocol; or receiving configuration information, sent by the network device, of the target information.

19. The terminal according to claim 18, wherein the target information comprises at least one of entire content of a specific reference signal or entire content of a channel; and the configuration information comprises at least one of following:

a type of a signal or a channel;

a period and an offset of the first OFDM symbol;

a mapping time-frequency position of the signal or the channel;

a sending manner of the signal or the channel; or an antenna sending manner of the signal or the channel; and/or the target information comprises at least one of a part of content of a specific reference signal or a part of content of a channel; and the configuration information further comprises:

indication information, wherein the indication information is used to indicate a sub symbol used to transmit the target information.

20. The terminal according to claim 19, wherein the indication information is information in a sub symbol indication domain.

* * * * *